United States Patent

Kaul et al.

[11] Patent Number: 5,563,260
[45] Date of Patent: Oct. 8, 1996

[54] PHTHALOCYANINE SOLVENT DYES

[75] Inventors: Bansi L. Kaul, Biel-Benken, Switzerland; Dominique Pflieger, Tagsdorf, France

[73] Assignee: Sandoz Ltd., Basel, Switzerland

[21] Appl. No.: 385,612

[22] Filed: Feb. 9, 1995

[30] Foreign Application Priority Data

Feb. 12, 1994 [DE] Germany .................. 44 04 556.5
May 24, 1994 [DE] Germany .................. 44 18 114.0

[51] Int. Cl.$^6$ .................................................. C09B 47/04
[52] U.S. Cl. .................. 540/133; 540/122; 540/123; 540/124; 540/131; 106/410
[58] Field of Search .................. 540/122, 124, 540/133

[56] References Cited

U.S. PATENT DOCUMENTS

| | | | |
|---|---|---|---|
| 4,318,883 | 3/1982 | Polony | 422/22 |
| 4,530,924 | 7/1985 | Polony | 514/191 |
| 5,296,023 | 5/1994 | Gregory et al. | 540/124 |
| 5,427,616 | 6/1995 | Tsuji et al. | 540/122 |
| 5,444,163 | 8/1995 | Dornhagen et al. | 540/131 |
| 5,492,563 | 2/1996 | Urban | 540/122 |

OTHER PUBLICATIONS

Search Report—Great Britain—for GB 9502457.6.
Derwent Abstract of: US 4530924; US 4318883.

*Primary Examiner*—Mukund J. Shah
*Assistant Examiner*—Pavanaram K. Sripada
*Attorney, Agent, or Firm*—Robert S. Honor; Carl W. Battle; Gabriel Lopez

[57] ABSTRACT

The compounds of general formula I

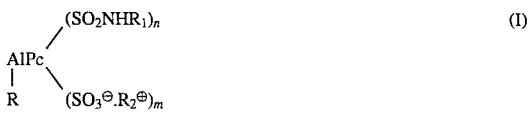

wherein
R represents chlorine or hydroxyl
Pc represents a phthalocyanine radical
$R_1$ may be alkyl and $R_2$ may be alkyl ammonium
are excellently suitable for dyeing of plastic materials, paper and inks for ball point pens.

4 Claims, No Drawings

PHTHALOCYANINE SOLVENT DYES

The present invention relates to phthalocyanine compounds according to the following formula I as well as to their use as solvent dyes. The invention relates further to a process for the production of said phthalocyanine compounds.

It has been found that compounds according to general formula I $$\text{AlPc}\begin{array}{c}(SO_2NHR_1)_n \\ | \\ R \quad (SO_3^\ominus \cdot R_2^\oplus)_m\end{array} \quad (I)$$

wherein

R represents chlorine or hydroxyl

Pc represents a phthalocyanine radical $R_1$ independently represents a linear or branched $C_{1-12}$alkyl radical, a cyclohexyl radical, a methylcyclohexyl radical or a radical of the following formula $$R_3-N\begin{array}{c}CH_3 \quad CH_3 \\ \diagup \\ \diagdown \\ CH_3 \quad CH_3\end{array}$$

where said $C_{1-12}$alkyl radical can be substituted by an alkoxy group having 1 to 4 carbon atoms $R_2$ independently represents a mono-, di- or tri-$C_{1-12}$alkyl ammonium radical, a cyclohexyl ammonium radical, a methylcyclohexyl ammonium radical or a radical according to one of the following formulae $$H_3\overset{\oplus}{N}-\begin{array}{c}CH_3 \quad CH_3 \\ \diagup \\ \diagdown \\ CH_3 \quad CH_3\end{array}-N-R_3, \quad \overset{H}{\underset{R_3}{\overset{\oplus}{N}}}\begin{array}{c}CH_3 \quad CH_3 \\ \diagup \\ \diagdown \\ CH_3 \quad CH_3\end{array}-R_4,$$

$$\underset{R_3}{\overset{H}{\underset{\diagup}{\overset{\oplus}{N}}}}\begin{array}{c}CH_3 \quad CH_3 \\ \diagup \\ \diagdown \\ CH_3 \quad CH_3\end{array}=O, \quad H_3\overset{\oplus}{N}-CH_2-C(\text{alkyl})_3 \text{ or}$$

$$H_2\overset{\oplus}{N}=C\begin{array}{c}NHR_5 \\ \diagdown \\ NHR_5\end{array}$$

wherein $R_3$ independently represents a hydrogen, a $C_{1-4}$alkyl radical, a formyl radical or a $C_{1-3}$alkyl carbonyl radical, $R_4$ represents —OH or —NH$_2$, $R_5$ independently represents a phenyl radical which can be substituted by a chlorine atom, a bromine atom, a nitro group, a cyano group or up to two methyl, methoxy or ethoxy groups m has a value of 0, 1 or 2 n has a value of 2, 3 or 4 in which the sum of m and n is 2, 3 or 4 are excellent dyes, for example suitable for the dyeing of plastics moulding compounds or spinning solutions, paper and inks for ball point pens. New compounds of formula I are difficultly soluble in water and readily soluble in organic solvents. They belong to the class of the solvent-soluble dyes. Dyes of the following formula Ia are preferred $$\text{AlPc}\begin{array}{c}(SO_2NHR_1')_{n'} \\ | \\ R' \quad \ominus \oplus \\ (SO_3R_2')_{m'}\end{array} \quad (Ia)$$

wherein

R' represents chlorine $R'_1$ independently represents a linear or branched $C_{3-8}$alkyl radical, a 2,2,6,6-tetramethylpiperidyl-4 radical or a cyclohexyl radical, where said $C_{3-8}$alkyl radical can be substituted by an alkoxy group having 1 to 4 carbon atoms $R'_2$ independently represents a group selected from the following formulae $$H_3\overset{\oplus}{N}-\begin{array}{c}CH_3 \quad CH_3 \\ \diagup \\ \diagdown \\ CH_3 \quad CH_3\end{array}-NH, \quad H_2\overset{\oplus}{N}-\begin{array}{c}CH_3 \quad CH_3 \\ \diagup \\ \diagdown \\ CH_3 \quad CH_3\end{array}-R_4,$$

$$H_2\overset{\oplus}{N}-\begin{array}{c}CH_3 \quad CH_3 \\ \diagup \\ \diagdown \\ CH_3 \quad CH_3\end{array}=O, \quad H_2\overset{\oplus}{N}=C(NHR_5)_2 \text{ or}$$

$$H_3\overset{\oplus}{N}-CH_2-C(\text{alkyl})_3$$

m' has a value of 0 or 1 n' has a value of 2, 3 or 4 in which the sum of m' and n' is 3 or 4.

Especially preferred compounds are those of formulae Ib $$\text{AlPc}-(SO_2NHR''_1)_{n''} \quad (Ib)$$
$$|$$
$$R$$

wherein $R''_1$ independently represents a linear or branched alkyl radical having 3 to 8 carbon atoms, preferably a 2-ethylhexyl radical and n" has on average the value of 3.

It will be obvious to the person skilled in the art that such compounds also contain a minor amount of sulphonic acid salt groups.

Further, in this specification, where a range is given, the figures defining the range are included therein.

The new compounds according to the present invention can be produced by reacting one mol of a compound of general formula II

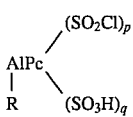

wherein p has a value of 2, 3 or 4 q has a value of 0, 1 or 2 the sum of p and q is 2, 3 or 4 with n moles of at least one amine according to formula III

The condensation product may contain unreacted sulfochloride groups which have to be saponified.

The possibly remaining sulfonic acid groups in the condensation product are reacted with a mono-, di- or tri-($C_{1-2}$)alkylamine, cyclohexylamine, methylcyclohexylamine or with at least one compound of formula IV

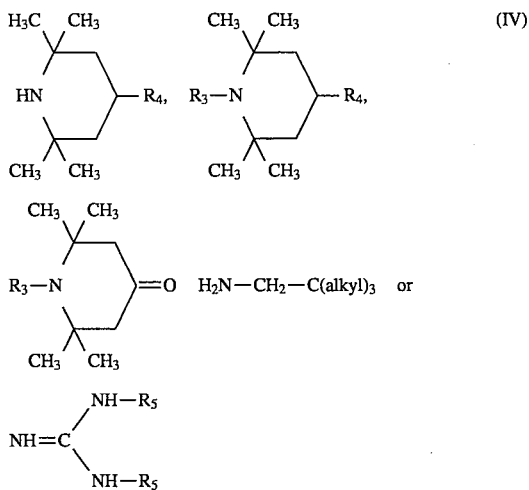

where the symbols are as defined above
resulting in ammonium salt formation.

The aluminium phthalocyanines used as the staring material can be produced, for example, by methods analogous to those described in example 1 and 1a of DE-OS 28 12 261.

The aluminium phthalocyanine sulfonic acid chlorides are made by known methods, e.g. by heating the aluminium phthalocyanine in chlorosulfonic acid to a temperature between 110° C. and 145° C. If the mixture is heated to 115° C. for 3 hours, a product having on average 3 substitutents per molecule is obtained. If it is heated to 135° C. a product having on average 4 substitutents per molecule is obtained. These substitutents are mainly sulfochloride groups and to a lesser extent sulfonic acid groups. The sulfonic acid groups can be converted partially or completely into sulfochloride groups by reaction with, for example, thionyl chloride. The resulting sulfochloride compounds are isolated by pouring the reaction mixture into an ice-water mixture followed by filtering.

The condensation reaction between the sulfochloride compounds according to formula II and the amines according to formula III is preferably carried out in aqueous suspension at temperatures of between 0° and 100° C., particularly between 0° and 60° C., in a slightly acid, neutral or alkaline medium, preferably at pH-values of between 5 to 10.

The above-mentioned ammonium salt formation reaction is also carried out preferably in an aqueous suspension at temperatures of between 0° and 100° C., particularly between 20° and 60° C., at pH-values of between 4 and 7. The resulting products are obtained in pure form by filtration, washing and drying, if necessary after neutralisation of the aqueous phase. Converting into the finely powdered form is achieved by grinding according to known methods.

The new blue dyes are suitable for, e.g. dyeing of organic solvents, inks of ball point pens, bulk-dyeing of paper, non-baking and baking or acid-catalyzed lacquers, based on nitrocellulose, solvent soluble natural or synthetic resins. The dyes according to the present invention are further very useful for the bulk-dyeing of plastics, such as cellophane, polyethylene and films or sheets thereof, acetylcellulose, polyester resin, as well as for varnishing of foils, preferably aluminium sheets, for flexographic printing and production of solvent wood stains.

The remarkable features of the compounds according to the invention are their light fastness, their transparency, their heat stability and their particularly good solubility in alcohols and ketones.

The following examples wherein parts are by weight and the temperatures are in ° C. illustrate but do not limit the invention.

I. Production of the phthalocyanine compounds according to the invention

Example 1

57.6 parts of monochloro-aluminium phthalocyanine and 270 parts of chlorosulfonic acid are mixed. This mixture is heated to 106° C. over a period of 1 hour and is maintained at 106°–108° C. for 5 hours. The cooled reaction mixture is poured on to 1200 parts of ice. The precipitated chloro-aluminium phthalocyanodisulfonic acid chloride is sucked off and washed with ice-water. The wet filter press cake is mixed into a mixture consisting of 400 parts of ice and 200 parts of water. To this well-stirred suspension 27 parts of 1-amino-2-ethylhexane is added dropwise followed by the addition of 15 parts of anhydrous sodium carbonate. The mixture is stirred at 0° C. for 5 hours and then at room temperature for 10 hours. After warming the reaction mixture to 60° C., the precipitated dye is sucked off, washed with water and dried at 70 ° C. in vacuum. The obtained monochloro-aluminium phthalocyanine-disulfonic acid-(2'-ethyl)-hexylamide

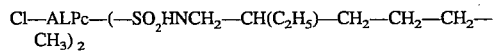

is a blue powder soluble in acetone. It is able to provide uniform, very light-fast coloration on both aluminium and plastics materials.

Example 2

A mixture consisting of 57.6 parts of monochloro-aluminium phthalocyanine and 270 parts of chlorosulfonic acid is heated to 120° C. over a period of 1 hour and is then maintained at 120°–123° C. for 5 hours. The cooled reaction mixture is poured on to 1200 parts of ice. The precipitated chloro-aluminium phthalocyanine-trisulfonic acid chloride is sucked off and washed with ice-water. The wet filter press cake is mixed into a mixture consisting of 400 parts of ice and 200 parts of water. To this well-stirred suspension 40 parts of 1-amino-2 -ethylhexane is added dropwise at 0° C. followed by the addition of 20 parts of anhydrous sodium carbonate in small amounts. Following the procedure in example 1 monochloroaluminium phthalocyanine-trisulfonic acid-(2'-ethyl)hexylamide

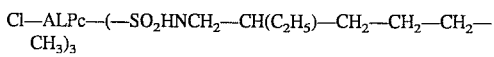

is obtained. It is easily soluble in acetone to give a blue color and is highly suitable for the spin-dyeing of acetate rayon in an uniform, bright blue and light-fast manner.

Example 3

52.0 parts of monohydroxy-aluminium-phthalocyanine and 270 parts of chlorosulfonic acid are mixed and while stirring heated to 115° C. for 3 hours. After this the temperature is reduced to 80°–85° C. and 15 parts of thionyl chloride is added. After maintaining the mixture under stirring at 85° C. over a period of 2 hours it is poured on to a mixture consisting of ice and water. The insoluble monohydroxy-aluminium-phthalocyanine having on average about 3 sulfochloride groups per molecule is sucked off and well washed with acidified ice-water. The residue is mixed with 600 parts of ice-water and then mixed with 18 parts of methoxypropylamine. The pH-value is adjusted to a value of 9 by addition of a sodium hydroxide solution. Under stirring, the temperature is raised to 60° C. within 3 hours whereby the pH-value is maintained at the value of 9 by simultaneously addition of a sodium hydroxide solution. As soon as no more alkali is consumed, the reaction mixture is acidified to a pH-value of 5 using hydrochloric acid.

23.9 parts of N,N'-di-ortho-tolylguanidine is dissolved in 200 parts of water and the pH-value is adjusted to a value of 1 using hydrochloric acid. The solution is then filtered and the pH-value is adjusted to a value of 4 using crystalline sodium acetate. The solution thus obtained is added to the dyestuff solution at 50° C. The reaction mixture is stirred further for 2 to 3 hours at 50° C. The pH-value is then adjusted to a value of 7 by adding sodium bicarbonate, followed by filtration of the dye-stuff corresponding approximately to the following formula

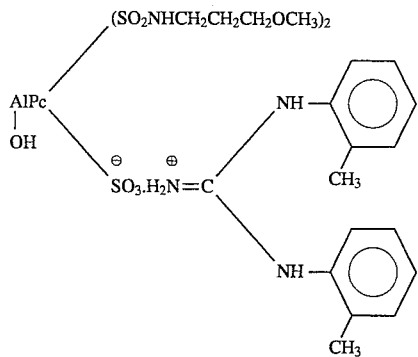

After washing with water until the product is salt free, it is dried at 80° C. in vacuum. The resultant blue powder is suitable for the above-mentioned applications after grinding according to known methods.

Example 4

Following the procedure in example 3, a dyestuff according to the following formula is obtained if the 52 parts of monohydroxy-aluminium-phthalocyanine are replaced by equivalent amounts of monochloro-aluminium-phthalocyanine. Its properties are the same as those of the dyestuff of example 3.

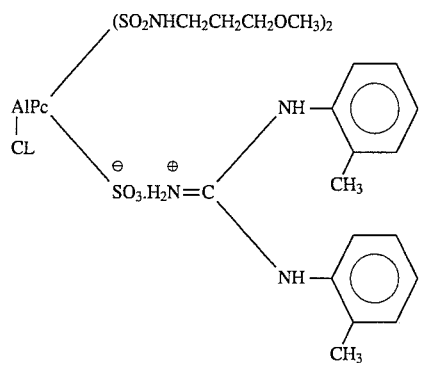

Examples 5 to 8

Following the procedure in example 2 and using the equivalent amounts of the following amines instead of the 40 parts of 1-amino-2-ethylhexane, similar dyestuffs having the same properties as the dyestuff of example 2 are obtained.

| Example No. | Amine |
|---|---|
| 5 | Cyclohexylamine |
| 6 | Ethoxypropylamine |
| 7 | n-Propylamine |
| 8 | n-Butylamine |

Examples 9 and 10

If the 23.9 parts of N,N'-di-ortho-tolylguanidine used in example 3 is replaced by equivalent amounts of the following guanidines, dyestuffs with similar properties as that corresponding to example 3 are obtained.

| Example No. | Guanidine |
|---|---|
| 9 | N,N'-diphenyl-guanidine |
| 10 | N,N-bis-(3,5-dimethylphenyl)-guanidine |

Example 11

20.0 parts of chloro-aluminium-phthalocyanine and 100 parts of chlorosulfonic acid are mixed and heated under stirring to 115° C. for 20 hours. The temperature is then reduced to 50° C. to 85° C. and 5.5 parts of thionyl chloride is added slowly. The mixture is stirred further at 85° C. for 2 hours and is then poured on to a ice-water mixture. The resultant insoluble aluminium-phthalocyanine having on average approximately 3 sulfochloride groups per molecule is filtered and well washed with acidified ice-water. The residue is mixed first with 220 parts of ice-water and then with 16.9 parts of cyclohexylamine. The pH-value is adjusted to a value of 9 by adding sodium hydroxide solution. Under stirring, the temperature is raised to 60° C. over a period of 3 hours, and the pH-value is adjusted to a value of 9 by simultaneous addition of sodium hydroxide. As soon as no more alkali is consumed, the mixture is acidified to a pH-value of 5 using hydrochloric acid.

8.1 parts of triacetonediamine is dissolved in 50 parts of water and the pH-value is adjusted to a value of 1, followed by filtration of the solution. After adjusting the pH-value of the filtrate to a value of 4 using crystalline sodium acetate, this solution is mixed with the solution of the aluminiumophthalocyanine compound. After further stirring for 2 to 3 hours at 50° C., sodium carbonate is added until a pH-value of 7 is achieved. The formed insoluble dyestuff is sucked off, washed with water until it is salt free, dried in vacuum at 50° C. and ground according to known methods to give a form suitable for the above-mentioned applications. The dyestuff corresponds approximately to the following formula

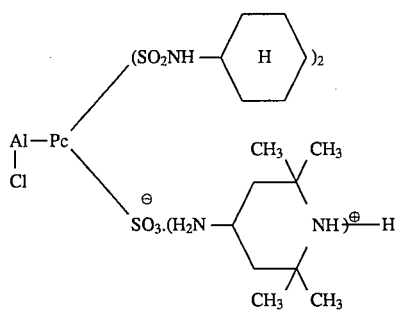

and is capable of imparting blue colour to plastics, laquers and inks.

Examples 12 to 17

Dyestuffs according to the invention can be prepared analogously to the procedure described in example 11 using the compounds listed in the following table.

| Example No. | R   | $R_1$                         | $R_2$ | m | n |
|-------------|-----|-------------------------------|-------|---|---|
| 12          | Cl  | 2-ethylhexyl                  | 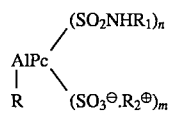 $H_3N-CH_2-C(C_{8-12}H_{17-25})_3$* | 1 | 2 |
| 13          | Cl  | 2,2,6,6,tetramethyl-piperidyl-4 | —     | 0 | 4 |
| 14          | Cl  | cyclohexyl                    | —     | 0 | 4 |
| 15          | —OH | cyclohexyl                    | 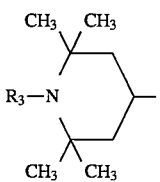 | 1 | 3 |
| 16          | —OH | 2-ethylhexyl                  | "     | 1 | 2 |
| 17          | —OH | 2-ethylhexyl                  | "     | 2 | 2 |

* mixture of alkylamines, trademark "Primene 81 R".

II. Production of an ink for ball point pens

Examples 18 and 19

To a mixture of
28 parts of a commercial alkyd resin, free of oil (grade 100%)
26 parts of 1,2-propanediol
20 parts of benzyl alcohol/phenylcarbinol
21,5 parts of 2-ethyl-1,3-hexandiol
4,5 parts of oleic acid
35 parts of the dyestuff of Example 1 or 11 is added and heated under stirring to 140° C. A blue high-quality ink suitable for ball point pens is obtained.

III. Production of a laquer based on a vinylcopolymer

Examples 20 and 21

To a mixture of
13 parts of a commercial vinylcopolymer (polyvinyl chloride/polyvinyl acetate)
6,5 parts of commercial acrylic resin
6,5 parts of dioctyl phthalate
25 parts of toluene
40 parts of methyl ethyl ketone
10 parts of ethylene glycol
5 parts of the dyestuff of example 3 or 12 is added at room temperature. The blue solution is formed easily and rapidly and is ready for use immediately.

We claim:
1. A compound of formula I

$$\text{AlPc} \begin{matrix} (SO_2NHR_1)_n \\ \\ R \quad (SO_3^\ominus \cdot R_2^\oplus)_m \end{matrix} \qquad (I)$$

wherein

R represents chlorine or hydroxyl

Pc represents a phthalocyanine radical $R_1$ independently represents a linear or branched $C_{1-12}$alkyl radical, a cyclohexyl radical, a methylcyclohexyl radical or a radical of the following formula $$R_3-N\begin{matrix} CH_3 \quad CH_3 \\ \\ CH_3 \quad CH_3 \end{matrix}$$

where said $C_{1-12}$alkyl radical can be substituted by an alkoxy group having 1 to 4 carbon atoms $R_2$ independently represents a mono-, di- or tri-$C_{1-12}$-alkyl ammonium radical, a cyclohexyl ammonium radical, a methylcyclohexyl ammonium radical or a radical according to one of the following formulae

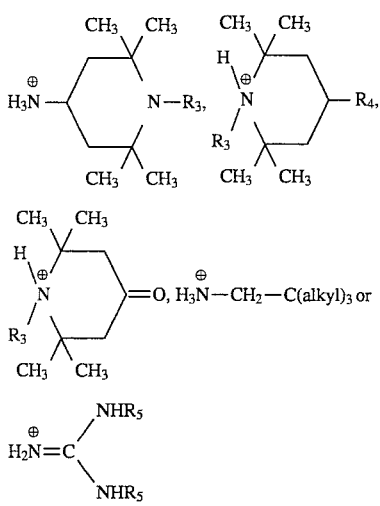

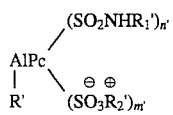

wherein $R_3$ independently represents a hydrogen, a $C_{1-4}$alkyl radical, a formyl radical or a $C_{1-3}$alkyl carbonyl radical, $R_{1-4}$ represents —OH or —NH$_2$, $R_5$ independently represents a phenyl radical which can be substituted by a chlorine atom, a bromine atom, a nitro group, a cyano group or up to two methyl, methoxy or ethoxy groups m has a value of 0, 1 or 2 n has a value of 2, 3 or 4 in which the sum of m and n is 2, 3 or 4.

2. A compound of formula Ia according to claim 1

$$\underset{R'}{\overset{(SO_2NHR_1')_{n'}}{AlPc}}_{(SO_3R_2')_{m'}^{\ominus\ \oplus}}$$ (Ia)

wherein

R' represents chlorine

R'$_1$ independently represents a linear or branched $C_{3-8}$alkyl radical, a 2,2,6,6-tetramethylpiperidyl-4 radical or a cyclohexyl radical, where said $C_{3-8}$alkyl radical can be substituted by an alkoxy group having 1 to 4 carbon atoms R'$_2$ independently represents a group selected from the following formulae

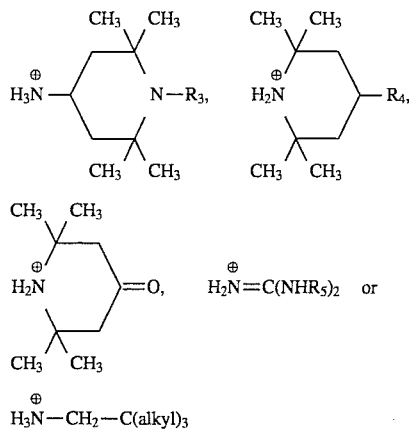

$R_4$ and $R_5$ are as defined above m' has a value of 0 or 1 n' has a value of 2, 3 or 4.

in which the sum of m' and n' is 3 or 4.

3. A compound of formulae Ib according to claim 1

$$\underset{R}{\overset{|}{AlPc}}-(SO_2NHR''_1)_{n''}$$ (Ib)

wherein

R''$_1$ independently represents a linear or branched alkyl radical having 3 to 8 carbon atoms, preferably a 2-ethylhexyl radical n'' has on average the value of 3.

4. A method of using a compound of claim 1 for dying plastic materials, paper, and inks of ball point pens which comprises incorporating into said materials, paper, and inks an effective amount of a compound of claim 1.

* * * * *